United States Patent [19]

Buchacher

[11] Patent Number: 5,239,822
[45] Date of Patent: Aug. 31, 1993

[54] COMPOSITE STRUCTURE FOR THRUST REVERSER TORQUE BOX

[75] Inventor: Daniel A. Buchacher, Kirkland, Wash.

[73] Assignee: The Boeing Company, Seattle, Wash.

[21] Appl. No.: 822,487

[22] Filed: Jan. 14, 1992

[51] Int. Cl.⁵ .............................................. F02R 3/02
[52] U.S. Cl. .................... 60/226.2; 60/39.31; 244/110 B; 244/117 R
[58] Field of Search .............. 60/226.2, 39.31; 244/110 B, 117 R, 133; 239/265.27, 265.29

[56] References Cited

U.S. PATENT DOCUMENTS

| | | | |
|---|---|---|---|
| 3,262,270 | 7/1966 | Beavers | 60/226.2 |
| 3,288,404 | 11/1966 | Schmidt et al. | |
| 4,038,118 | 7/1977 | James | |
| 4,055,041 | 10/1977 | Adamson et al. | |
| 4,132,069 | 1/1979 | Adamson et al. | |
| 4,471,609 | 9/1984 | Porter et al. | |
| 4,533,098 | 8/1985 | Bonini et al. | 244/117 R |
| 4,560,122 | 12/1985 | Parkinson et al. | |
| 4,596,621 | 6/1986 | Nawaz | 244/110 B |
| 4,710,412 | 12/1987 | Darrieux | |
| 4,725,019 | 2/1988 | White | |
| 4,807,434 | 2/1989 | Jurich | 60/226.2 |
| 4,826,106 | 5/1989 | Anderson | 244/117 R |
| 4,827,248 | 5/1989 | Crudden et al. | 244/110 B |
| 4,854,525 | 8/1989 | Chee | |

Primary Examiner—Richard A. Bertsch
Assistant Examiner—Michael I. Kocharov
Attorney, Agent, or Firm—Hughes & Multer

[57] ABSTRACT

A one-piece composite material torque box for the thrust reverser assembly of a jet engine. The torque box is made up of three composite material subassemblies, a generally planar flange subassembly, a tubular torque tube subassembly, and a cap subassembly. The flange subassembly is configured to transmit tension loads from the cascades of the reverser assembly to the V-blade ring which engages the engine, and the fibers in the composite material are aligned with these load paths. The torque tube subassembly is mounted to the flange subassembly, and is configured to transmit torsion loads from the actuators of the reverser assembly to the upper and lower latch members of the engine assembly; the fibers of the composite material therein are aligned at 45° angles to the tube axis, so as to be in alignment with paths of the tension/compression components of the torsion loads. The cap subassembly extends over the torque tube subassembly and is bonded to the flange subassembly on either side thereof, so as to bond these three subassemblies together into a unitary structure.

27 Claims, 10 Drawing Sheets

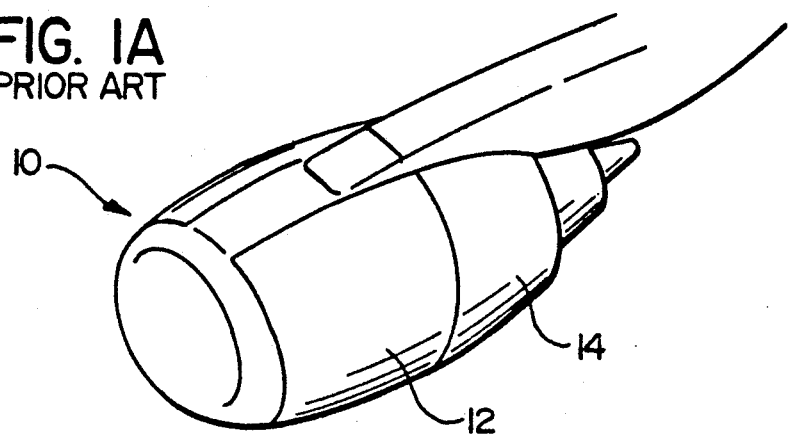
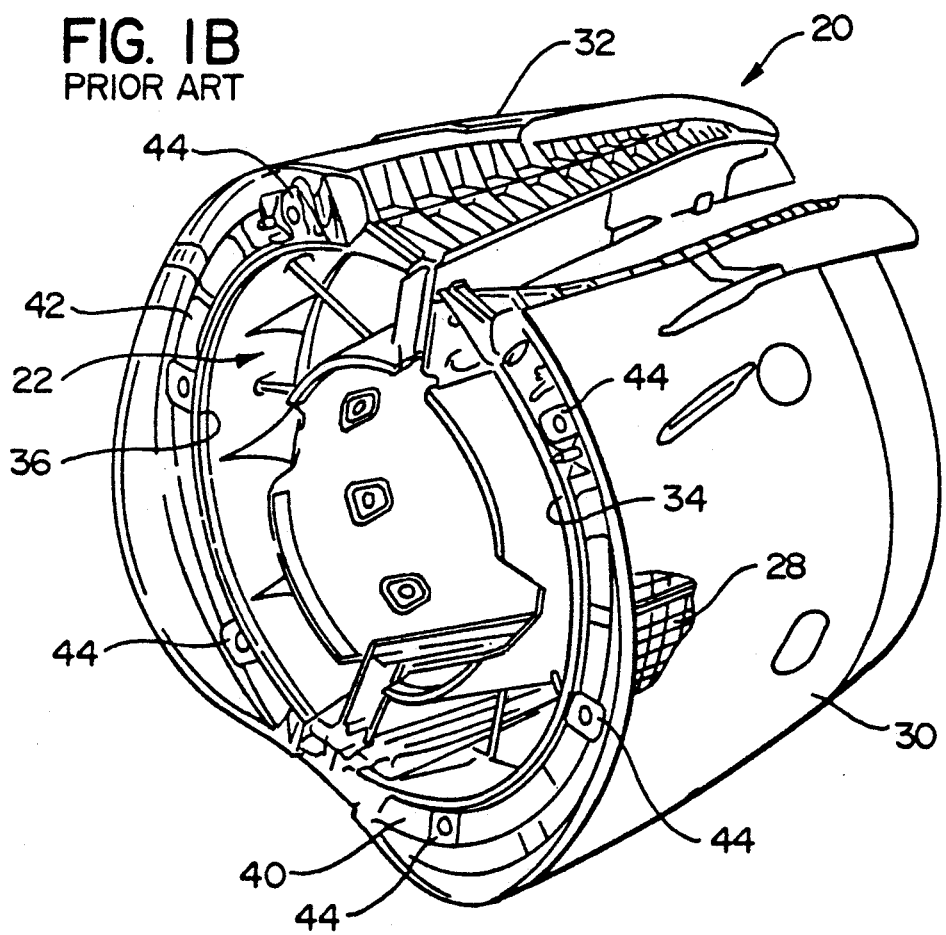

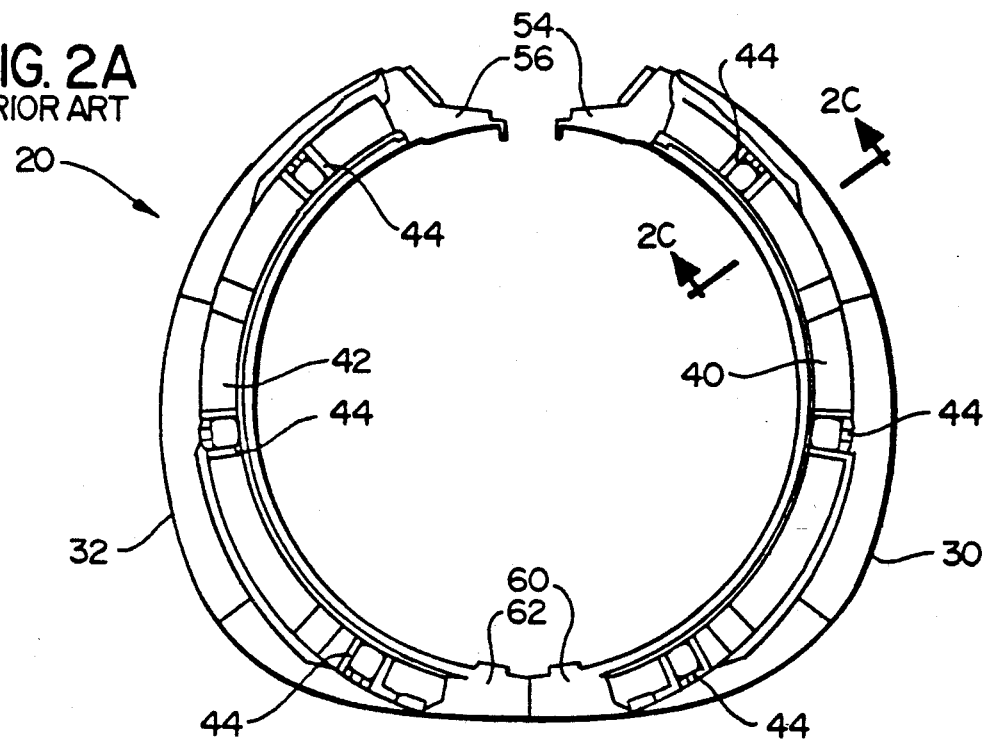
FIG. 2A PRIOR ART
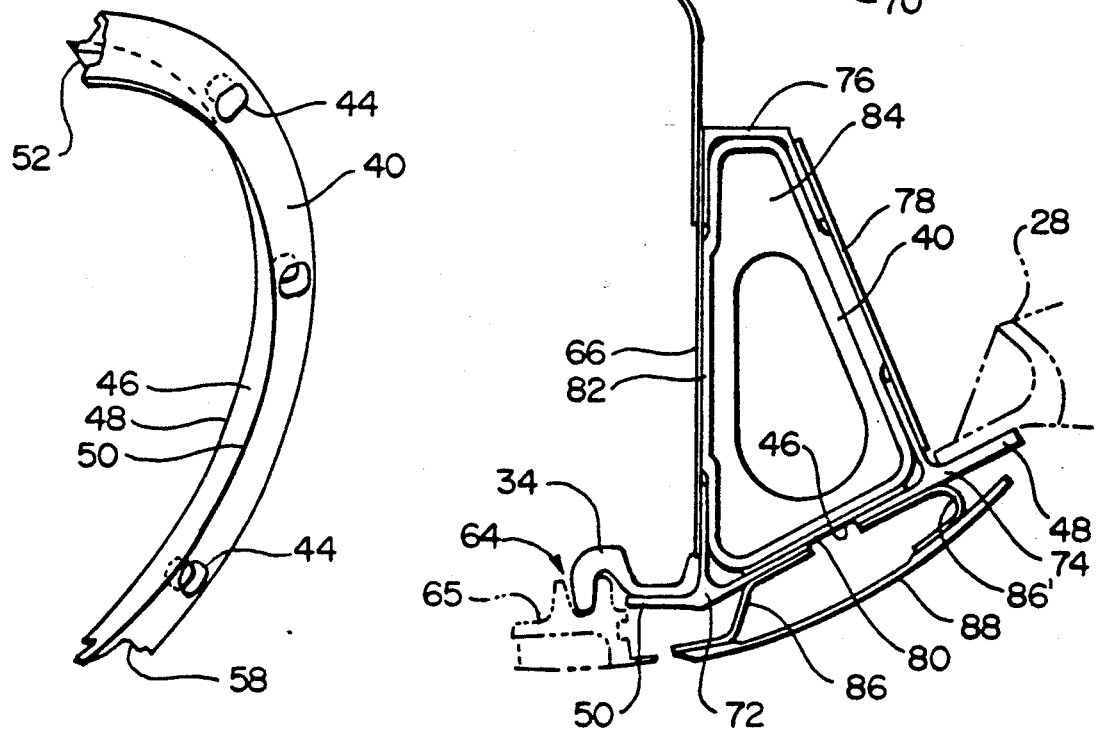
FIG. 2B PRIOR ART
FIG. 2C PRIOR ART

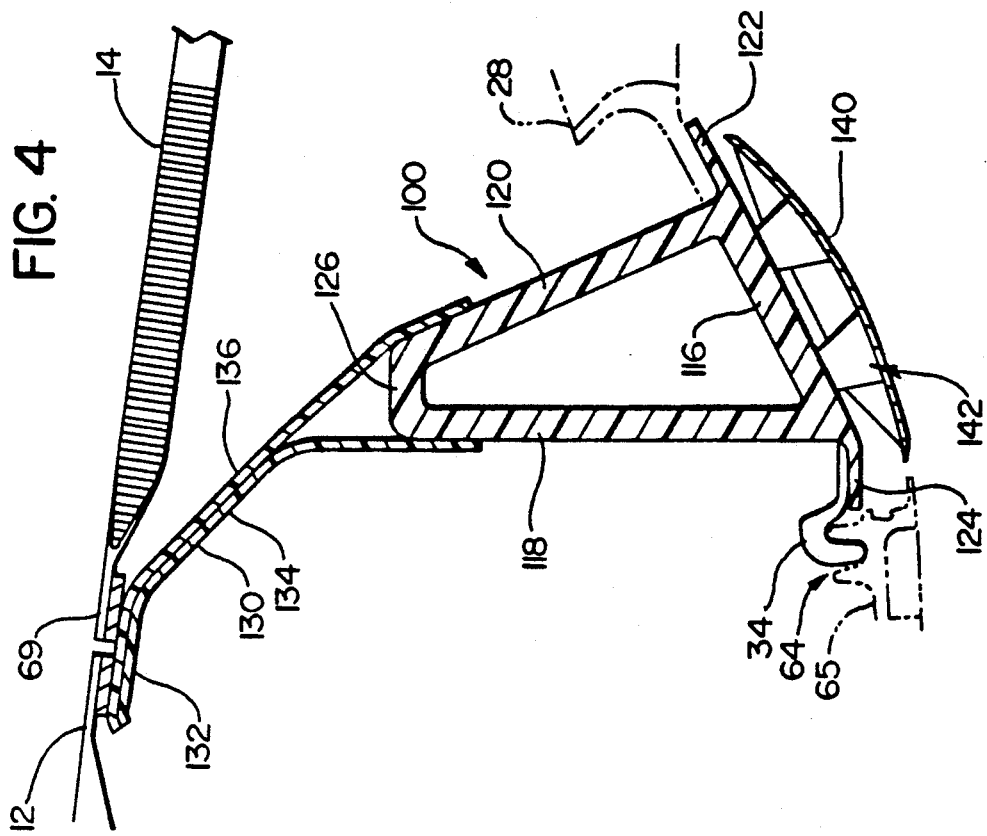
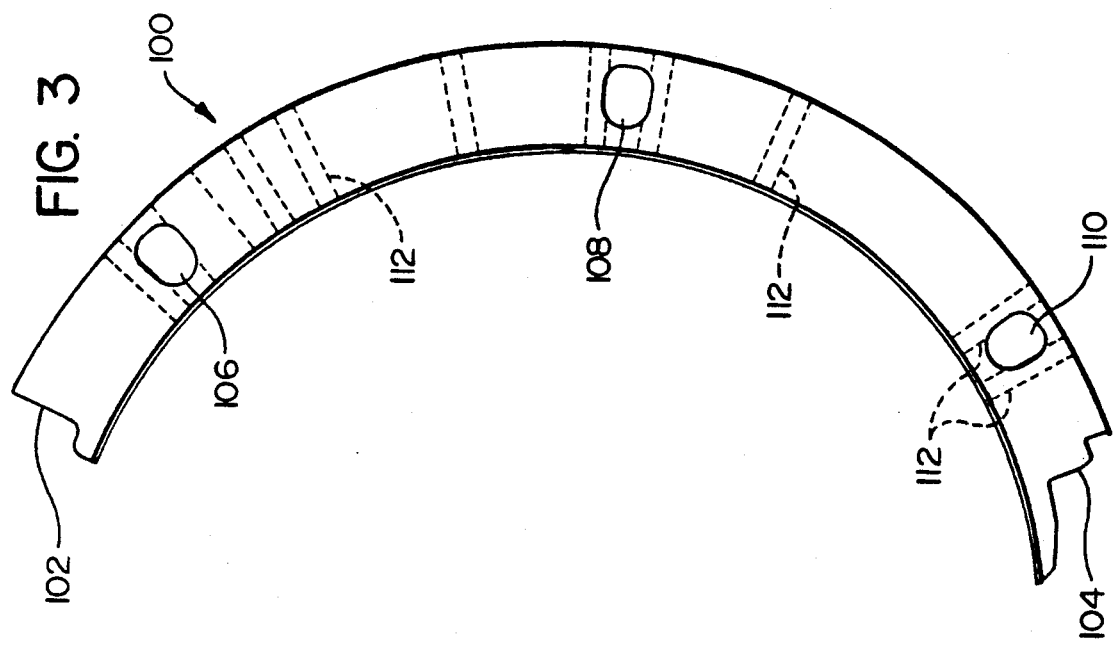

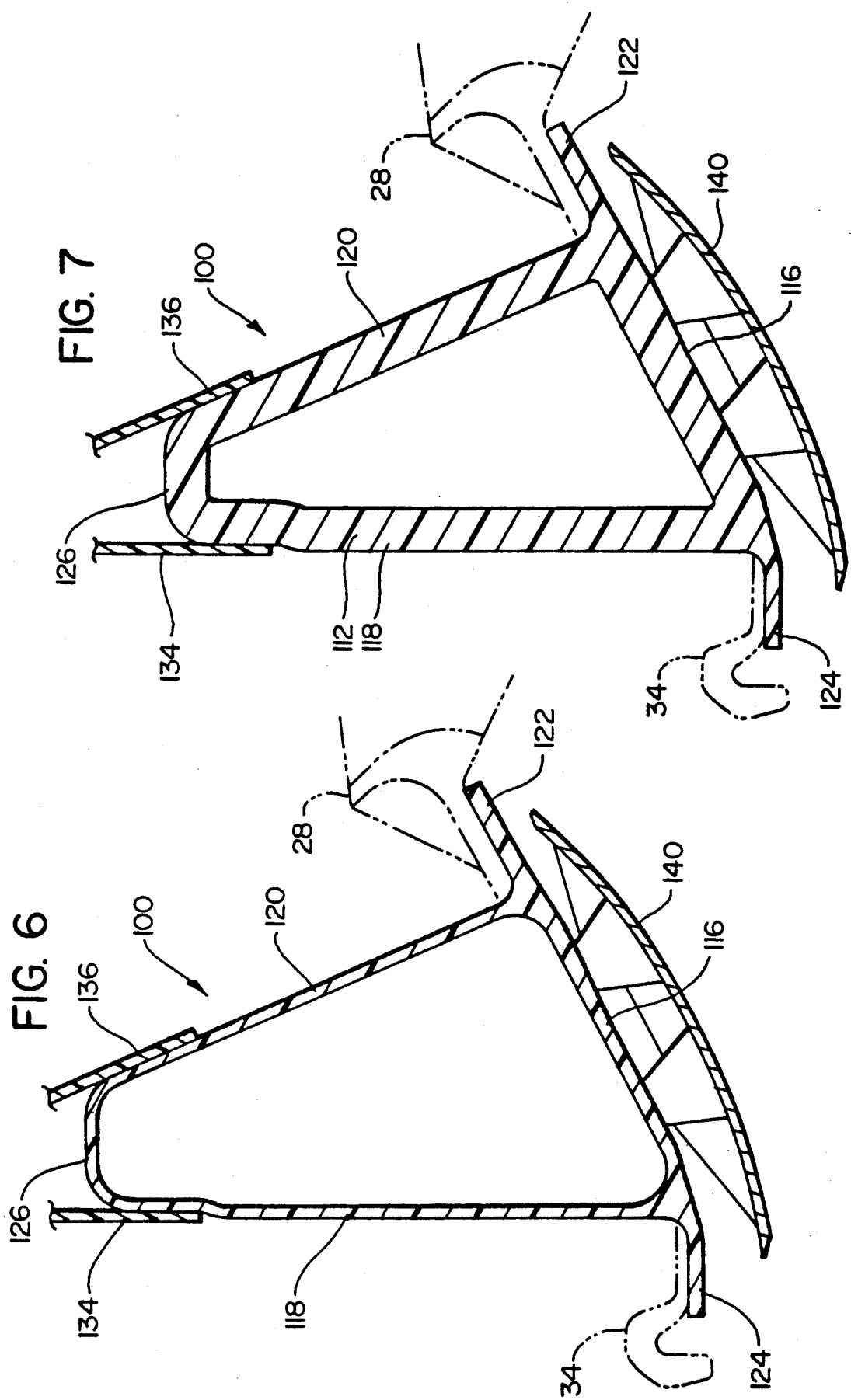

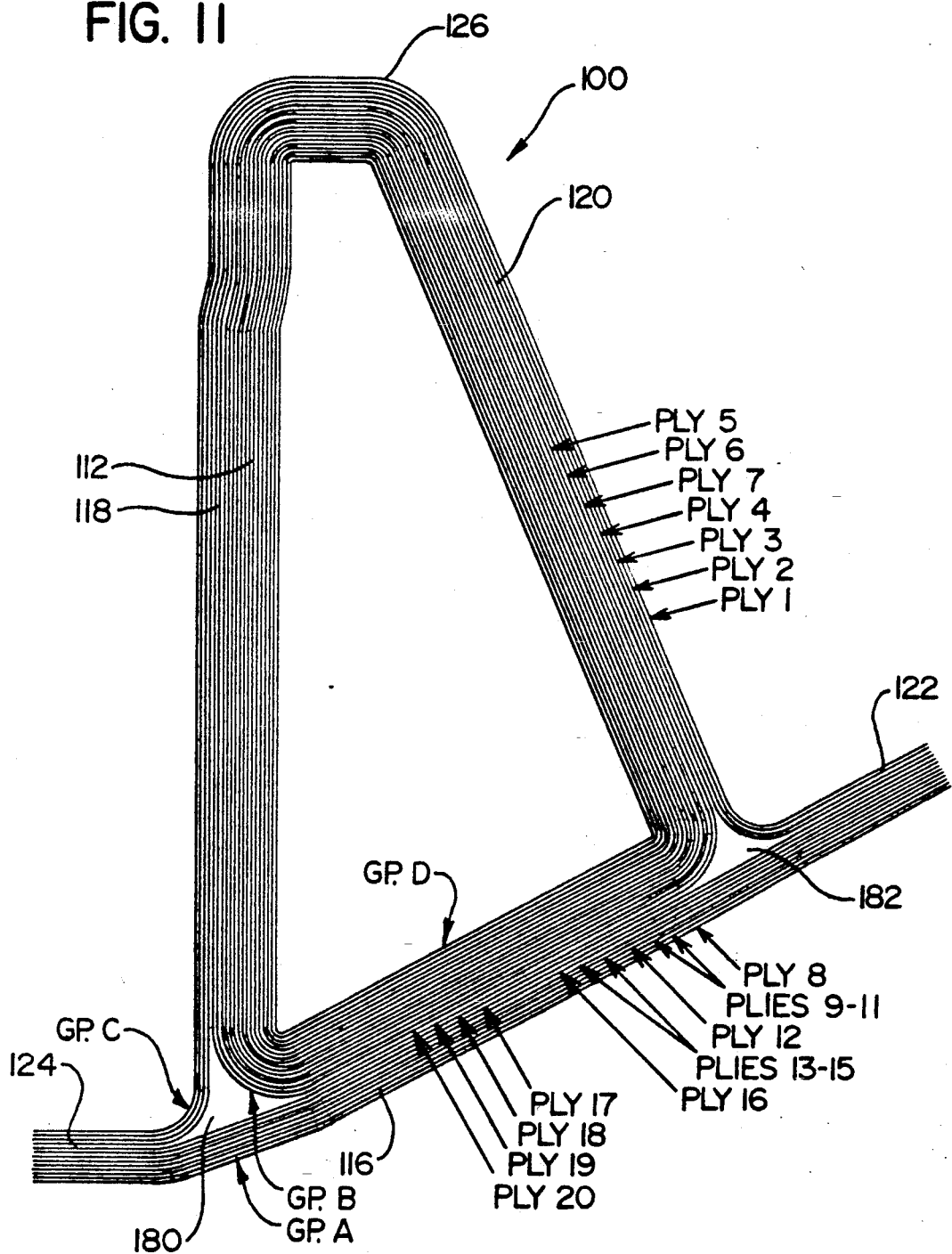

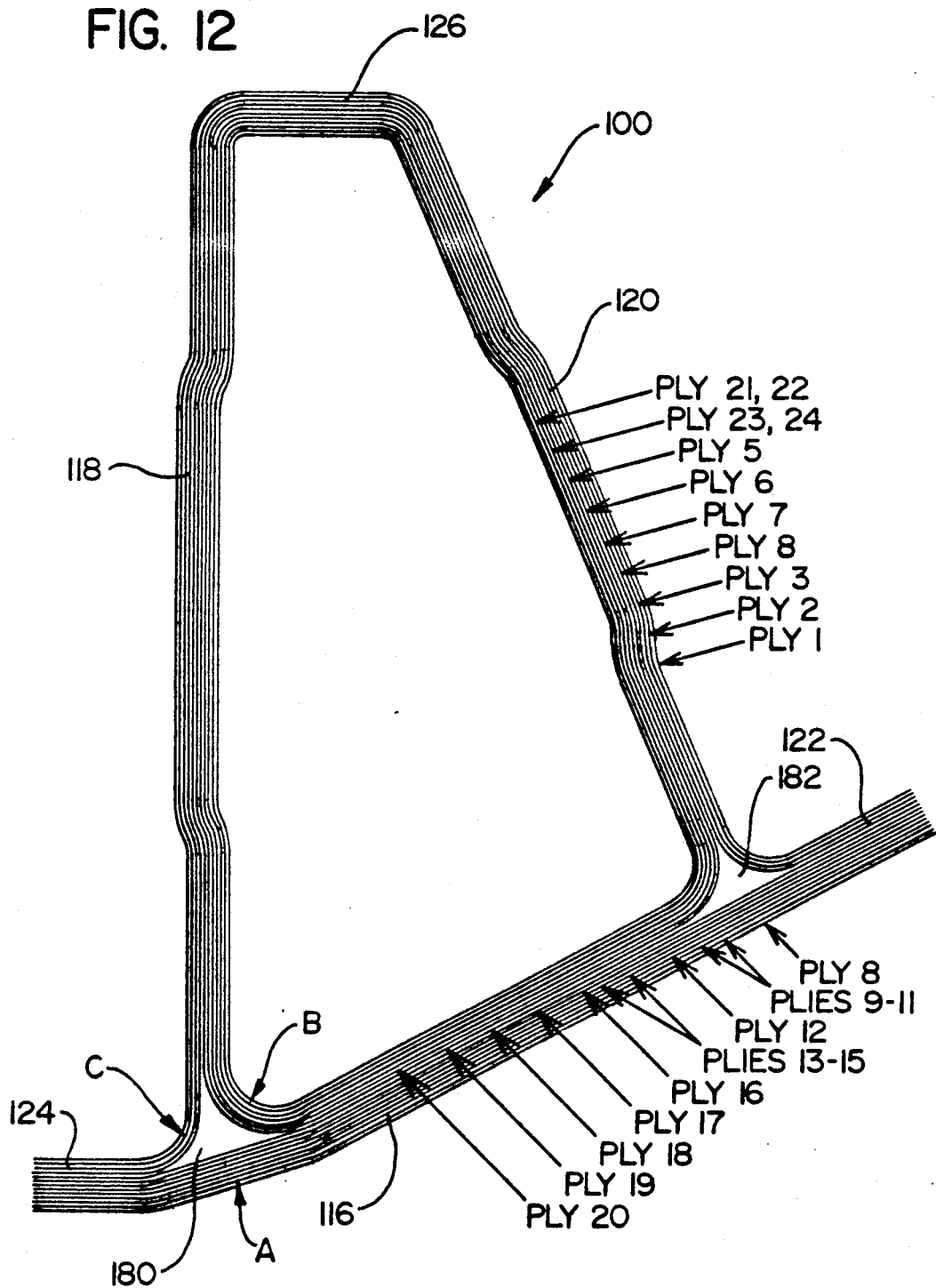

COMPOSITE STRUCTURE FOR THRUST REVERSER TORQUE BOX

BACKGROUND ART (a) Field of the Invention

The field of the invention relates to thrust reverser assemblies for jet aircraft engines, and more particularly, to a one-piece composite torque box for transmitting loads on the thrust reverser assembly to the engine and engine support structure.

(b) Background Art

Typical commercial aircraft gas turbine engines are surrounded and encapsulated by aerodynamic structural surfaces which form a nacelle. A typical nacelle structure 10 is shown in FIG. 1A, and this includes a forward fan cowl 12, and a thrust reverser cowl 14. This reverser cowl is part of the thrust reverser assembly which is included in most nacelles today.

An exemplary thrust reverser assembly 20 is shown in FIG. 1B. The thrust reverser forms a fan duct 22 during normal engine forward thrust operation. The assembly includes moving internal blocker doors and an outer sliding sleeve which, when actuated, block the fan flow and redirect it through grate-like, forward-guided vanes, or cascades 28 so as to produce reverse thrust. This reverse thrust is used for slowing the airplane upon landing. A typical thrust reverser 20, as shown in FIG. 1B, is made up of two cowl halves 30, 32. Each half hinges off the engine supporting strut, and engages a V-groove ring formed on the engine itself. FIG. 1B shows the semi-circular V-blade rings 34, 36 at the forward end of the reverser assembly which engage the V-groove in the engine. In this way, reverse thrust loads are transmitted to the engine and the strut.

The main structural part of the thrust reverser assembly which transmits the reverse thrust air loads on the cascade vanes out to the V-blade rings and the hinge and latch castings is called a torque box. First and second semi-circular torque boxes 40, 42 are shown installed in the first and second cowl halves 30, 32 in FIG. 1B. The reverse forces on the cascades "pull back" on the torque boxes, so as to subject parts of the box to tension loading; furthermore, the rod-like actuators which extend the two cowl halves also "pull back" on the torque boxes, these being connected to the torque boxes at a series of spaced apart bosses 44. Accordingly, it will be understood that the actuators and the cascades twist the box with respect to the fixed ends at the hinge and latch beams, so that the torque box is in torsion when the thrust reverser assembly is in operation.

FIG. 2A shows the two torque boxes 40, 42 installed in the cowl halves 30, 32, looking directly aft at the forward end of reverser assembly 20, and FIG. 2B shows an individual one of the torque boxes (40) removed from its associated cowl half to illustrate its overall configuration, most of the details of the torque box being omitted for purposes of clarity. As can be seen in FIG. 2B, the semi-circular torque box 40 is generally triangular in cross-section, and so has a generally planar inner or lower wall 46, bounded by an after edge 48 and a forward edge 50. The cascades are attached to the after edge 48 of the torque box, and the V-blade ring is attached to the forward edge 50. Wall 46 is thus subjected to tension during operation, and the actuators press rearward at bosses 44; the torque which is applied to the torque box is transmitted to its upper end 52, which is mounted to one of the castings 54, 56, which have hinge lugs by which the reverser is mounted on the strut. Similarly, at its lower end 58, the torque box is mounted to lower latch casting 60, 62. These hinge and latch castings (see FIG. 2A) are mounted to the engine strut so that the forces are transmitted thereto by the torque boxes.

FIG. 2C is a cross-section taken through the first cowl half 30 of FIG. 2A, showing the installation therein of a prior art-type torque box 40 configured generally as previously described, this cross-section being taken through one of the rib members of the torque box. As previously noted, the torque box is generally triangular in cross-section, and the grate-like cascades 28 (shown in phantom in FIG. 2C) are attached to the rearward edge 48 of wall 46, while the V-blade ring 34 is attached to the forward edge portion 50 of this wall, this V-blade ring being configured to engage the V-groove 64 on the engine casing 65 (also shown in phantom). The forward wall 66 of the torque box, in turn, extends to an outer corner where it is mated with the firewall 67 of the engine assembly. This firewall extends outwardly to an outer, flattened ring portion 68, a forward edge of which supports the fan cowling 12 of nacelle 10. A rearward portion of this flattened outer ring portion 68 supports the inner surface of the leading edge portion 69 of the outer sleeve 70 of the reverser cowl 14. It is this outer sleeve 70 which moves aftwards from the torque box structure when actuated by the actuator assemblies (not shown), thus allowing the air which is blocked from going rearward by the doors to be directed back through the cascades 28 in a forward direction, providing the desired braking action.

As can be seen from FIG. 2C, the prior art-type thrust reverser torque boxes are assembled from a large number of metallic details. The conventional torque box which is shown in this example is of a kind used in the General Electric/SNECMA CFM 56-3 engine installation for the Boeing 737-300, 400, and 500 series aircraft. Each of these torque boxes uses three stretch-formed aluminum extrusion corner members 72, 74, and 76, after and inner adhesively bonded doubled and tripled aluminum webs 78 and 80, a chem-milled titanium forward web 82, twelve inner forged aluminum ribs 84, and an aluminum built-up support structure 86, 86, for the aerodynamic bull-nose fairing which goes over the inner surface of the torque box. It will thus be appreciated that a great many manufacturing operations are required to produce the numerous metallic components from which each of the torque boxes is assembled, and that this is disadvantageous from an economic standpoint. Furthermore, in order to assemble these components together, a great many fasteners must be installed, and this is both costly and time consuming, and adds to the weight of the finished structure. Furthermore, because it is necessary to overlap the components in order to form joints in which the fasteners can be installed, the weight disadvantage is compounded.

Apart from the disadvantages in terms of cost and weight which have just been discussed, the built-up metallic torque box is a far from ideal structure for transmitting the forces which are applied to it. This is because, as is generally recognized, the most suitable structure for transmitting torque (and at the same time minimizing weight) is a tubular structure, while, for transmitting tension forces, a linear or planar structure is superior, and it is not efficient to construct a torque box 40 out of metallic details which combines these features to a satisfactory degree, yet which also meets the necessary weight limitations and is suitably configured to be mounted to the firewall, V-blade ring, and cascades in the manner previously described. The prior art torque box shown in FIG. 2C is at best a compromise in this regard, in that it is built up of the angular corner members and the spaced-apart aluminum ribs to achieve a compromise structure for transmitting these loads.

As will become apparent from a reading of the detailed description provided below, Applicant has solved the problems cited above by employing a torque box structure which is fabricated of graphite reinforced epoxy composite material. The generic advancement of composite materials to aircraft structures is, of course, known to those skilled in the art; a search of the patent literature has disclosed a number of patents related to such uses of composite materials, and these are listed as follows:

| U.S. Pat. No. | Patentee | Issue Date |
|---|---|---|
| 4,710,412 | Darrieux | Dec. 01, 1987 |
| 4,471,609 | Porter et al. | Sep. 18, 1984 |
| 4,132,069 | Adamson et al. | Jan. 02, 1979 |
| 4,055,041 | Adamson et al. | Oct. 25, 1977 |
| 4,038,118 | James | Jul. 26, 1977 |

Of these, Adamson et al. '041 and '069 both show an integral webbed structure, resembling a spoked wheel, which rigidly interconnects the outer nacelle and the engine so as to support the nacelle in its spatial relationship with the engine; Adamson et al. recite that it is preferable that this structure be fabricated from lightweight, high-strength composite materials, it being an object of the invention to reduce overall system weight.

Darrieux discloses a method of fabricating entire frames (e.g., for engines and aircraft) from resin-bonded filamentary material. The frame members are made by winding the filamentary material over a form (i.e., a mandrel) and then impregnating this material with hardenable resin, the hollow member which results being removable from the mold by providing a taper on the mandrel, or by the employment of stripping agents. The frame is then built up by securing these various members together.

Porter et al. show a lightweight, load-carrying engine core cowl which is made of a composite material, with air cooling being provided to the outer surface and interior of the cowl so as to preserve its load-carrying ability.

James shows a structure, such as an outer engine cowling, incorporating composite material reinforcing ribs made by wrapping a lightweight reinforcing material core with an adhesive tape containing continuous filament composite fibers. Metal inserts are positioned in the core to accept load-bearing fasteners, and loads transferred into the structure place the composite materials in tension or compression.

The review of the patent literature also disclosed a number of patents relating to engine mounting systems in general, and these are listed as follows:

| U.S. Pat. No. | Patentee | Issue Date |
|---|---|---|
| 4,725,019 | White | Feb. 16, 1987 |
| 4,560,122 | Parkinson et al. | Dec. 24, 1985 |
| 3,288,404 | Schmidt et al. | Nov. 29, 1966 |

White shows an aircraft engine mount providing isolation from vertical vibrations. Parkinson et al. show an arrangement where the engine is anchored not only in the vertical, lateral, and fore and aft senses, but also against angular movement in its pitch, roll, and yaw senses, in the event of partial or total failure of any on element of the attachment arrangement. Schmidt et al. show an engine mounting system for helicopters which has elastomeric mounts for vibration isolation; the system includes a torque tube which is mounted to bodies of a suitable elastomer.

Accordingly, a need exists for a torque box for use with thrust reverser assemblies which significantly reduces the number of individual details employed in its fabrication, and which also provides for reduced weight. Furthermore, a need exists for such a torque box which provides for more effective transmission of both torque and tension loads which are created by the operation of the reverse thruster assembly.

SUMMARY OF THE INVENTION

The present invention has solved the problems cited above by employing the concept of combinations of composite structures which are specifically configured to efficiently bear the required loads, i.e., a continuous torque tube for torsion, and a flange and caps for tension, shear, and compression. The invention comprises broadly a composite material torque box assembly made up of flange and torque tube subassemblies. The composite material flange extends in a generally planar direction, from an after portion which is configured to be mounted to the cascade members of the thrust reverser assembly, to a forward portion which is configured to be mounted to the engine of the aircraft, and transmits tension loads from the cascade members to the engine in this generally planar direction. The composite material torque tube subassembly extends generally along an axis, from a central portion which is configured to be mounted to the ends of the actuator members of the thrust reverser assembly, to end portions which are configured to be mounted to the support structure of the engine nacelle assembly, so that the torque tube subassembly transmits torsion loads to the support structure. This torque tube subassembly is attached to a side of the flange subassembly, so that the torque box assembly is formed as a substantially unitary composite material structure. The axis of the torque tube may be curved in a semi-circular direction to conform to a curved exterior of the engine.

The torque box assembly may further comprise a composite material cap subassembly which extends over the tube subassembly and is attached to the tube and flange subassemblies. This cap subassembly may comprise a generally planar rear flange portion which is attached to the after portion of the flange subassembly, a central portion which extends over, and is attached to, the tube subassembly, and another generally planar forward flange portion which is attached to the forward portion of the flange subassembly on the other side of the tube subassembly. The subassemblies may be attached by co-curing.

Also, the torque box assembly may further comprise composite material strengthening ribs which extend around the axis of the torque tube subassembly, with these strengthening ribs being attached to an interior surface of the tube.

The composite material of the torque box assembly may comprise a laminate of plies of linearly-extending fibers impregnated with a cured resin, and this material may be graphite-reinforced epoxy material. These plies of composite material may be aligned in the flange subassembly so that the fibers extend in a generally linear direction from the after portion of the flange to the forward portion, so that these fibers are aligned with the load paths of the tension loads which are transmitted from the cascade members to the engine. The plies of material in the torque tube subassembly, in turn, may be aligned so that the fibers extend at substantially 45° angles to the axis of the tube subassembly, so that these fibers are aligned with the load paths of the tension and compression components of torsion loads which are transmitted from the actuator members to the support structure. However, the plies of material in the internal strengthening ribs in the tube subassembly may be aligned so that the fibers extend at a substantially perpendicular angle to the axis of the tube, so as to provide these strengthening ribs with relatively greater stiffness.

Receiving areas may be formed in the central portion of the tube subassembly for receiving the ends of the actuator members, and these receiving areas may be flanked by pairs of the internal strengthening ribs. Metallic load-bearing fittings may be received in the interior of the tube subassembly at the ends of the torque box, these fittings extending from the support structure into the ends of the torque tube.

The torque box assembly may further be provided with first and second strips of filler material which are positioned adjacent to the first and second sides of the tube subassembly, where this is mounted to the side of the flange subassembly; these strips of filler material are overlain by the cap subassembly, and are sized to support the plies of composite material of the cap subassembly so that the fibers therein extend through a bend having a predetermined minimum radius where the portion of the cap subassembly which extends over the tube subassembly meets the flange portions which are bonded to the flange subassembly. These strips of filler material may be extruded strips of chopped composite material.

Configured to be installed in an otherwise conventional engine assembly, the tube subassembly may be generally triangular in cross-section, so that the torque box has generally planar forward and after walls formed by the tube and cap subassemblies, and a generally inner wall formed by the tube and flange subassemblies. This forward wall of the torque box assembly may be configured to be mounted to a firewall of the engine assembly, and the after wall of the torque box assembly may also be configured to be mounted to a secondary firewall. The inner wall of the torque box assembly, in turn, may be configured to be mounted to a bullnose fairing which provides a smooth flow of air to the cascade members which are mounted to the after portion of the flange subassembly, while the forward portion of the flange subassembly may be configured to be mounted to a V-blade ring which engages the V-groove formed on the engine.

The advantages and features of the invention discussed above and other advantages and features will become apparent from the detailed description of the invention which follows.

BRIEF DESCRIPTION OF THE DRAWINGS

FIG. 1A is a perspective view of an engine nacelle assembly;

FIG. 1B is a perspective view of the thrust reverser portion of the nacelle assembly of FIG. 1A, showing the torque boxes which are mounted in each of the cowl halves of the assembly;

FIG. 2A is an elevational view of the thrust reverser assembly of FIG. 1B, looking directly aft at the forward end of this assembly and showing the torque boxes mounted therein;

FIG. 2B shows one of the two torque boxes of the thrust reverser assembly of FIG. 2A, this being shown separated from the rest of the components of the assembly;

FIG. 2C is a sectional view taken along line 2C—2C of FIG. 2A, showing a prior art torque box mounted in the thrust reverser assembly of FIGS. 1B-2A;

FIG. 3 is an elevational view of a one-piece composite material torque box incorporating the present invention, this being configured for installation in the thrust reverser assembly of FIGS. 1B-2A;

FIG. 4 is a sectional view, similar to that shown in FIG. 2C, showing the one-piece torque box of FIG. 3 mounted in a thrust reverser assembly as shown in FIGS. 1B-2A;

FIG. 6 is a sectional view taken along line 6—6 of FIG. 5, showing a typical section through a standard wall area of the torque box of FIG. 5;

FIG. 7 is a sectional view taken along line 7—7 of FIG. 5, showing a typical section through a strengthening rib of the torque box of FIG. 5;

FIG. 11 is a sectional view showing a typical composite material laminate lay-up for the strengthening rib shown in FIG. 7;

FIG. 12 is a sectional view showing a typical composite material laminate lay-up for the upper and lower bifurcation attachment areas shown in FIGS. 8-9.

DETAILED DESCRIPTION

Figure 5:
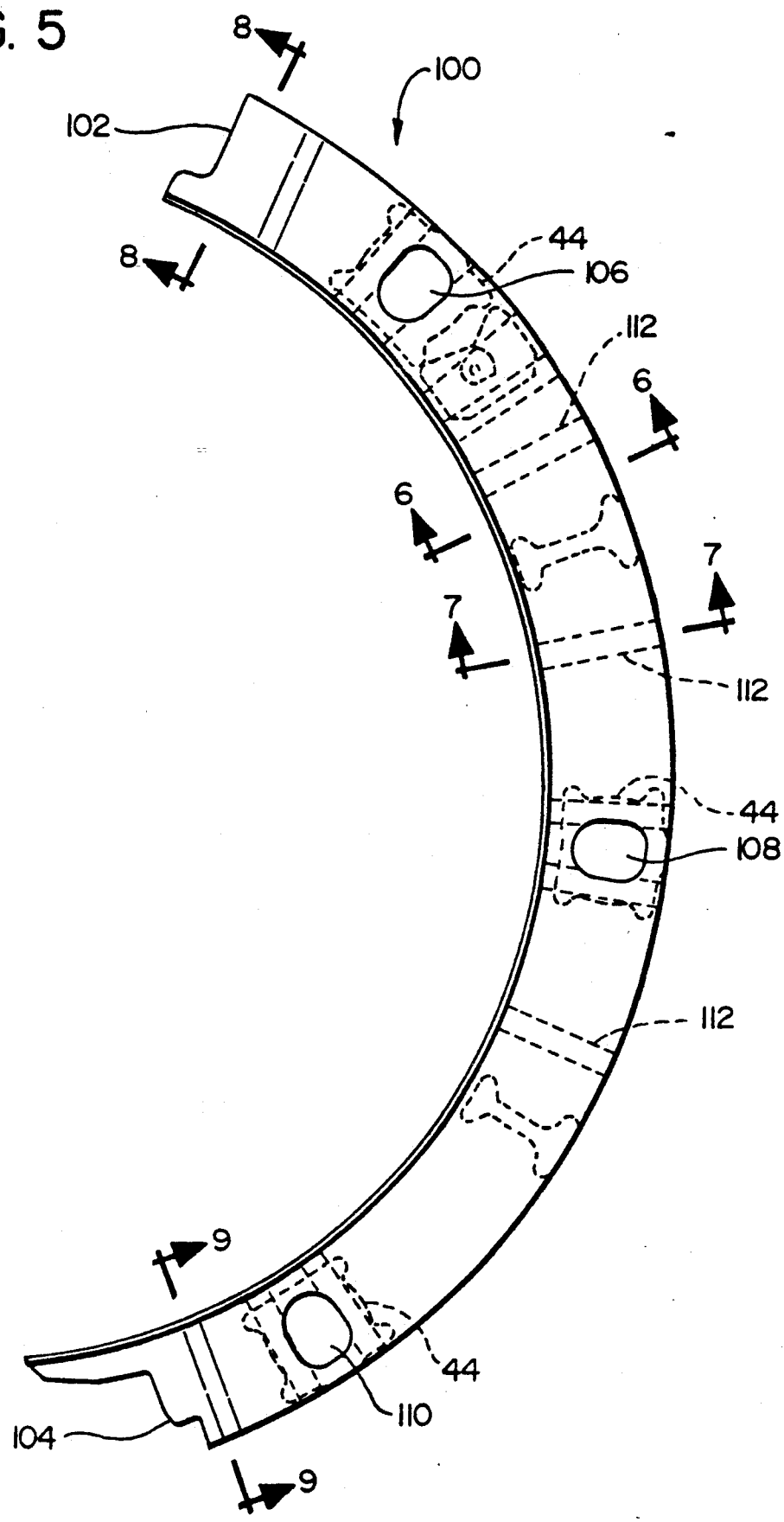
FIG. 5 is an elevational view, similar to that of FIG. 3, showing the one-piece composite material torque box incorporating the present invention, and further showing the internal strengthening ribs formed therein, and the inserts mounted therein for attachment to the upper and lower latch castings.

From the foregoing, it is apparent that the typical thrust reverser torque boxes known in the prior art are built up from a great number of individual metallic details which are riveted together, resulting in the structural and economic disadvantages previously described. FIG. 3 shows a one-piece composite material torque box in accordance with the present invention which overcomes these problems. This torque box 100 has an external configuration generally similar to that of the conventional torque boxes described above, and so this is generally semi-circular in shape (two boxes being used per nacelle assembly), and has a generally triangular cross-section. The upper end 102 of the torque box is configured to be mounted to the upper hinge casting of the engine nacelle assembly, and the lower end 104 being configured to be mounted to the lower latch casting. Furthermore, torque box 100 is provided with several (three, in this example) angularly spaced apart openings 106, 108, 110 which receive the ends of the actuator assemblies, in the manner previously described.

As will be described in greater detail below, torque box 100 is a one-piece composite unit which is constructed in part by wrapping graphite fiber sheets and tape around an internal mandrel or mold. At various points along the length of torque box 100, there are internal strengthening ribs 112 which are formed by increasing the thickness of the composite material at these points. These strengthening ribs 112 are positioned at selected points to provide additional strength to the structure where required; for example, pairs of ribs 112 flank each of the openings 106, 108, 110 so as to be able to effectively bear the loads which are applied thereto by the actuator assemblies and their associated mounting bosses, and other strengthening ribs 112 are spaced through the body of the torque box so as to impart rigidity thereto and preserve its correct, load-bearing configuration when subjected to torsion loading.

FIG. 4 shows a cross-section of the torque box 100 of the present invention mounted in a nacelle assembly in place of the complex, built-up torque box shown in FIG. 2C, this cross-section being taken through one of the integral strengthening ribs of the torque box. From this cross-section, it is readily apparent that the many individual metallic details used in the prior art torque box shown in FIG. 2C have been replaced with a simple, unitary structure, thus achieving economies in terms of both cost of fabrication and weight, this latter advantage being complemented by the inherent lightweight characteristics of the GR/EP composite material.

Torque box 100 is generally triangular in cross-section, and so has an inner wall 116, a forward wall 118, and an after wall 120. This inner wall 116 is bounded by integral rear flange portion 122 and integral forward flange portion 124; these form attachment areas for cascades 28 and V-blade ring 34, respectively, in the manner previously described. As was also previously described, the outwardly-projecting outer corner or rim 126 of the torque box is mounted to an outwardly extending firewall 130, which, in turn, extends outwardly to the flattened ring portion 132 which supports the edges of the fan and reverser cowls 12, 14. The firewall may be a conventional metallic firewall such as that shown in FIG. 2C (which, again, is built up of several individual metallic details), or, as is shown in FIG. 4, this may be a lightweight, two-piece composite firewall made up of a forward syntactic GR/EP laminate wall 134 bonded to an after syntactic GR/EP laminate wall 136. These two walls 134, 136 are bonded together face-to-face at outer ring portion 132, but at they extend inwardly, they spread apart adjacent the outer corner or peak 126 of the torque box, the forward firewall being mounted to the forward wall of the torque box, and the after firewall being mounted to the after wall. This arrangement provides superior distribution of loads to the walls of the torque box.

A bullnose fairing is mounted to the inner wall 116 of torque box 100. Again, this may be a conventional bullnose fairing such as that shown in FIG. 2C, or, as is shown in FIG. 4, this may be a four-piece injection molding instead of being supported by built-up metallic details (e.g., 86, 86' shown in FIG. 2C), further enhancing the cost and weight-saving advantages of the installation.

Having described the one-piece composite torque box of the present invention in overview, its structural features and fabrication will now be described in greater detail. Turning to FIG. 5, this presents an enlarged view of torque box 100, with a number of its internal components being shown in phantom. As previously noted, the upper end 102 of the torque box is configured to be mounted to the upper hinge casting of a nacelle assembly, and so this is in the form of a socket which receives a metallic (e.g., aluminum) load-bearing fitting 148 therein for the physical attachment to the bifurcation; similarly, an aluminum bifurcation fitting 150 is received in the lower end 104 of the torque box. For corrosion protection, standard isolation techniques known to those skilled in the art should be used for isolating the aluminum-graphite/epoxy interfaces of the bifurcation fittings and other metallic fittings installed in the composite torque box; this applies to the cascades as well, unless these also are fabricated of composite material.

Additional load-bearing fittings installed on the torque box 100 include the previously described bosses 44 for the actuator assemblies, these being mounted about the openings 106, 108, 110 formed in the torque box.

Figure 9:
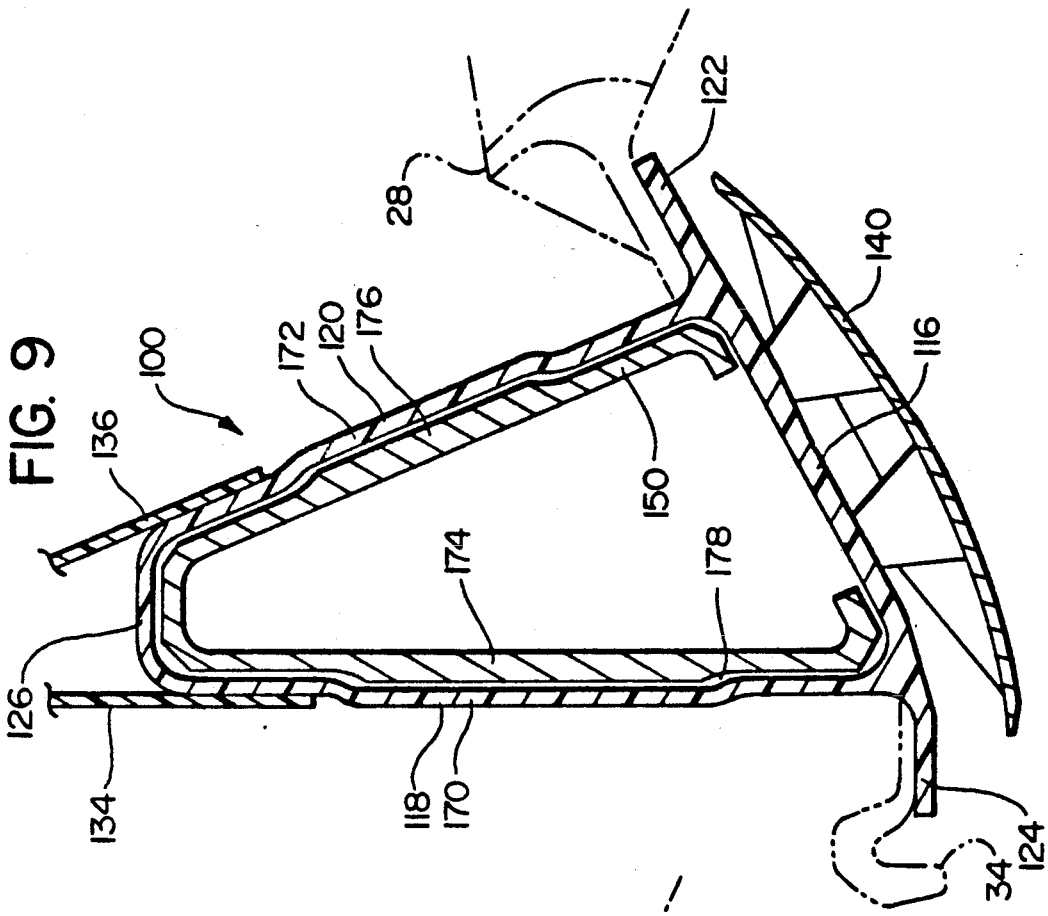
FIG. 9 is a sectional view taken along line 9—9 of FIG. 5, showing a typical section through the upper bifurcation attachment of the torque box of FIG. 5.
Figure 8:
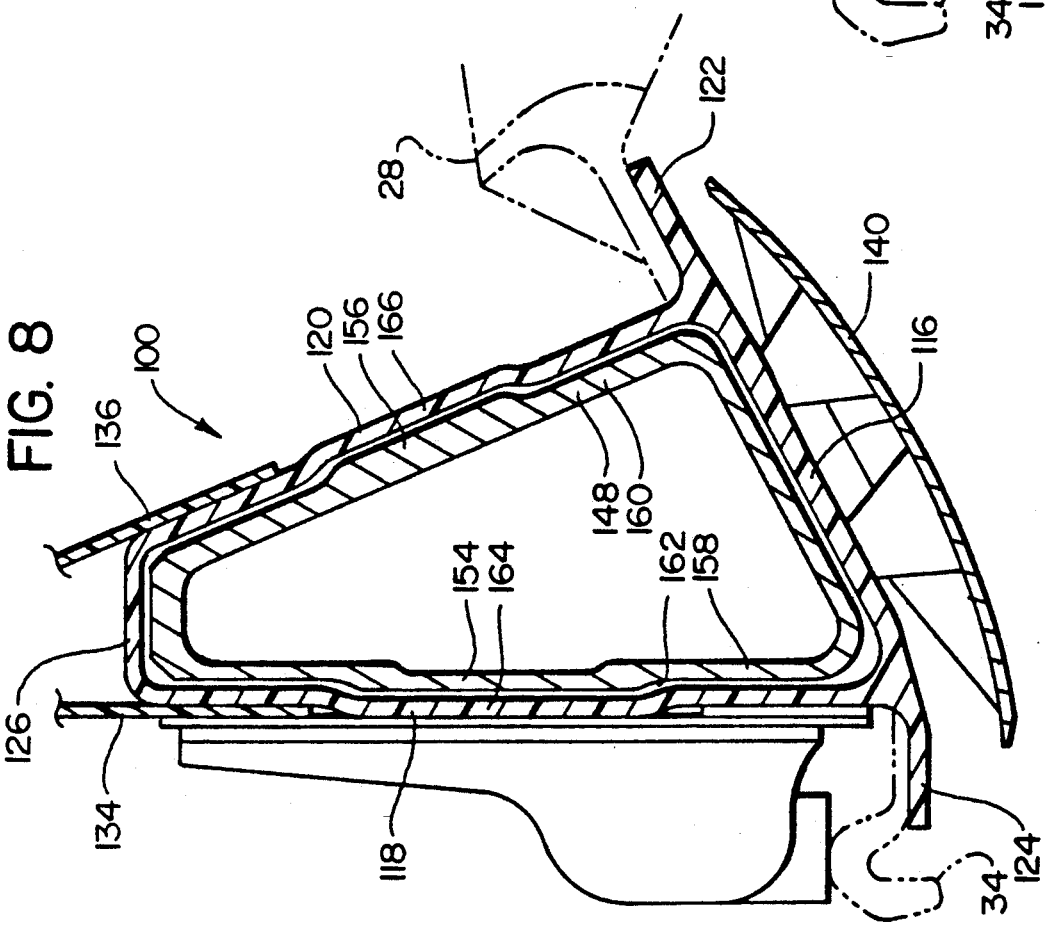
FIG. 8 is a sectional view taken along 8—8 of FIG. 5, showing a typical section through the upper bifurcation attachment of the torque box of FIG. 5.

As previously described, exemplary torque box 100 is a constant radius, one-piece per cowl half, hollow GR/EP molding, triangular in section, with integral flanges forward and aft for V-blade ring and cascade attachment. The molding is comprised of a laminate wall structure of continuous fiber GR/EP fabric and tape, with integrally molded inner rib stiffeners also of fabric and tape. The upper and lower bifurcation attachment regions of the semi-circular box are also thickened and bulged to receive the bifurcation/torque box attachment extensions 148, 150. FIGS. 6–9 show cross-sections through representative portions of this box, specifically, a section through a standard wall portion of the box (FIG. 6), a section through one of the strengthening ribs (FIG. 7), and sections through the upper and lower bifurcation attachment regions (FIGS. 8–9).

As noted, FIG. 6 shows a section through a standard wall area of the torque box. Accordingly, the wall thickness in this area is relatively thin; for example, in the exemplary Boeing 737-300 CFM 56-3 installation described above, this thickness may typically be on the order of 0.106 inches. The rear and forward integral mounting flanges 122, 124, in turn, are somewhat thickened for load-bearing attachment to the cascades and V-blade ring, and in this example they may have thicknesses on the order of 0.196 inches and 0.161 inches, respectively. As for the overall external dimensions of the torque box in this example, the after wall 120 may be on the order of 5.00 inches high, the forward wall 118 may be on the order of 6.25 inches high, the inner wall 116 (from edge to edge) may be about 6 inches wide, and the radius of the flattened outer corner 126 of the box may be about 36.75 inches. It will also be noted from FIG. 6 that an annular recess or indentation is formed in the forward wall 118 for receiving the inner lip of the forward firewall 134, so that the forward face of the firewall lies flush with the forward face of wall 118.

FIG. 7 shows a typical section through an integrally formed strengthening rib 112. The exterior dimensions of this portion of the torque box remain substantially the same as for that portion shown in FIG. 6 (i.e., the portion without the strengthening ribs), but here the inner, forward, and after walls 116, 118, 120 have all been thickened considerably so that they extend further into the interior of the hollow box. For example, in the application discussed above these walls may have a typical thickness on the order of 0.408 inches. As previously noted, these thickened ribs 112 provide the box with additional strength and rigidity where needed.

FIGS. 8 and 9, in turn, show typical sections through the thickened and bulged portions of the torque box at the upper and lower bifurcation attachments. FIG. 8 shows the area which receives the upper bifurcation attachment 148. This fitting has a generally triangular cross-section sized to fit into the hollow interior of the torque box 100 in this area, and includes strengthening bulges 154, 156 which extend outwardly from the forward and after walls 158, 160 of the fitting. These bulges are received in corresponding bulges 164, 166 formed in the forward and after walls 118, 120 of the torque box. Similarly, the forward and after walls 118, 120 of the area of torque box 100 shown in FIG. 9 incorporate bulges 170, 172, which accommodate corresponding strengthening bulges 174, 176 formed in the forward and after walls of lower bifurcation fitting 150. While typically not as thick as the strengthening ribs 112 shown in FIG. 7, these walls of the box may be relatively thickened in these areas; for the exemplary application discussed above, a typical thickness for the forward and after walls in these areas may be about 0.145 inches. It should also be noted that the triangular cross-sections of the upper and lower bifurcation attachments and the torque box walls in these areas should normally be sized so that shim gaps 162, 178 e.g., about 0.05 inches) are provided between the walls of these components.

Figure 10:
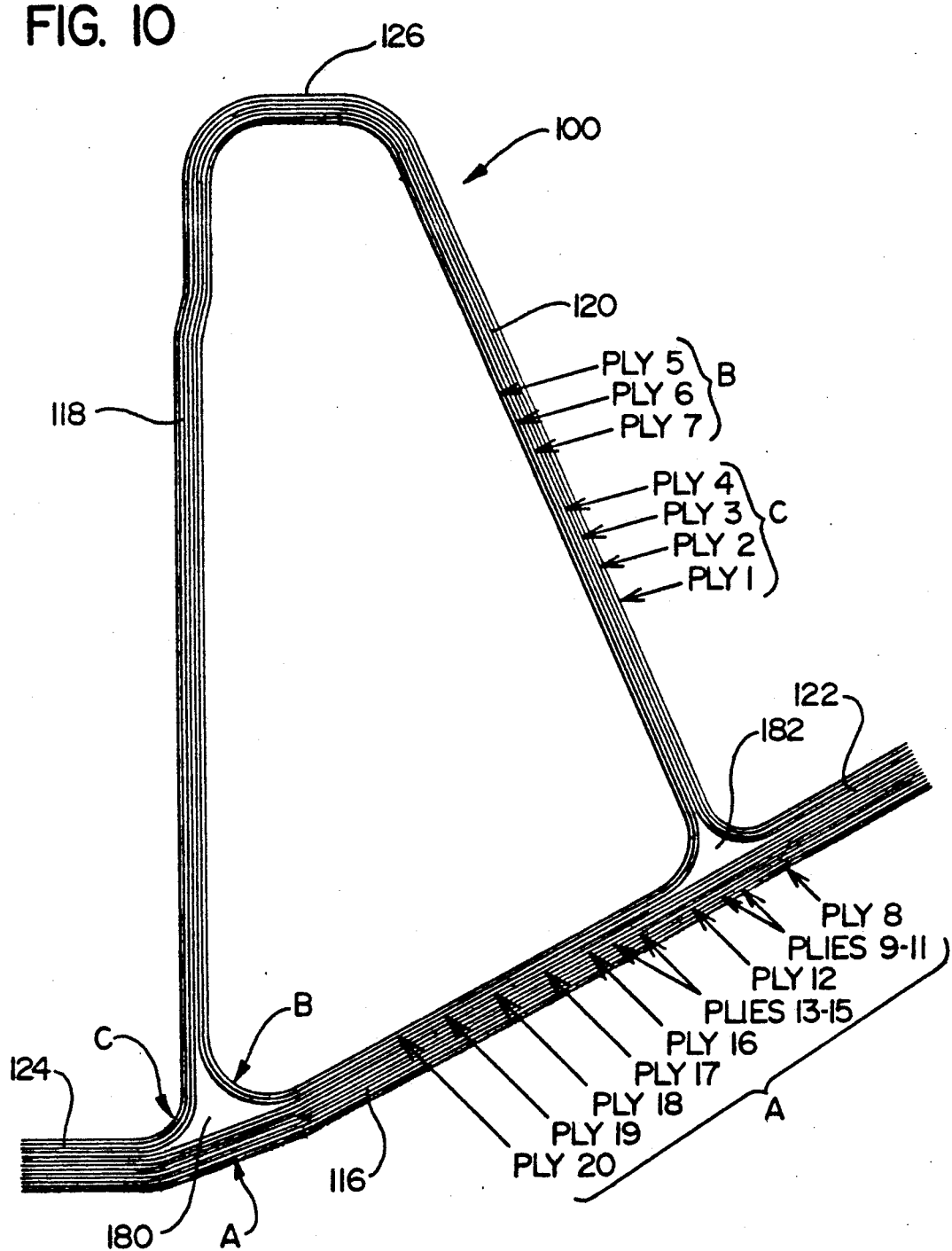
FIG. 10 is a sectional view showing a typical composite material laminate lay-up for the standard wall section shown in FIG. 6.

FIGS. 10-12 show the laminate structure of the walls of the torque box in the areas shown in the cross-sections of FIGS. 6-9, particularly with respect to how these laminate layers are arranged to transmit the loads which are applied to the torque box during operation of the reverse thruster assembly.

FIG. 10 corresponds to FIG. 6, and shows the construction of a typical thin-walled area of the torque box 100. As is readily apparent from FIG. 10, the layers of laminate material which make up the walls and flanges of the box in this area can be considered as falling into one of three groups: Group A, which extend more-or-less directly or linearly from the after flange to the forward flange of the box; Group B, which are wrapped around the hollow central portion of the box in a tubular fashion; and Group C, which extend along the forward and rear flanges of the box, and then over the top or peak of the box, so as to form a cap over the tubular portion of the box. In the exemplary construction shown in FIG. 10, Group A is made up of plies 8-20 extending across the bottom of the box from the after flange portion 122 to forward flange portion 124. Group B, in turn, is made up of plies 5-7, which surround the central open area of the box. Finally, Group C is made up of plies 4-1, which form the cap extending over the top of the box. In the completed structure, of course, these plies are impregnated with resin so that the groups of plies which make up the structure are all bonded together by co-curing.

In addition to the above-described groups of plies, there are longitudinally extending filler strips 180, 182 positioned along the sides of the internal tube where this meets the lower flange, and covered by the plies of the overlying cap. These fillers 180, 182 support the plies in the cap and internal tube in these areas so that the fibers therein transition through bends having selected minimum radii, so that these are not so sharp as to impair the strength or durability of the fibers. The filler strips may also he employed to impart additional strength to the torque box assembly.

Each of these groups of plies (Groups A, B, C) makes up a subassembly of the finished torque box, and each serves an important structural function which provides the torque box of the present invention with significant advantages. Firstly, the plies of Group A, make up a flange subassembly which extends more-or-less planarly from the after flange portion of the box to the forward flange portion. The after flange portion is mounted to the cascades of the thrust reverser assembly, which exert a force in the rearward (pull) direction when the reverser is in operation, and the forward flange of the box is mounted to the V-blade ring which engages the V-groove on the engine housing: because the plies of the flange subassembly (Group A) extend more-or-less in a straight line or plane, their fibers are ideally oriented to carry the virtually pure tension loading which is consequently placed on the lower flanges. In other words, the plies of Group A form an ideally oriented continuous flange for transmitting the tension loads from the cascades to the V-blade ring.

The Group B plies, in turn, essentially make up a torque tube subassembly for transmitting the torsion loading which is applied to the torque box by the actuators. As was noted above, a torque tube is generally considered to be an ideal configuration for transmitting torsion loads, and the plies of Group 8 wrapped around the interior of the box provide such a torque tube; furthermore, the composite material itself provides a significant advantage in this respect: a tube in torsion bears tension and compression loads at 45° to its longitudinal axis, and so in laying up the torque tube subassembly, the sheets making up the plies are oriented so that their fibers run in these directions (i.e., at 45° to the longitudinal axis of the box) so that the fibers therein are aligned with the 45° paths of the tension/compression loads when the tube is in torsion.

Finally, the Group C plies form a cap subassembly which goes over the top of the torque tube formed by the Group 8 plies, and this is bonded to the forward and after portions of the flange on either side of the torque tube, so as to securely mount the flange and torque tube subassembly together, and so as to carry a portion of the loads on these as well.

In summary, the composite material plies of the torque box assembly are oriented so that (1) the plies of Group A form a lower flange, with the fibers of these plies are aligned with the tension load paths between the cascades and the V-blade ring, (2) the plies of Group B are configured as a torque tube, with the fibers of these plies being aligned with the 45° tension/compression load paths of the tube in torsion, and (3) the plies of Group C form a shell or cap for bonding the other two subassemblies firmly together and sharing some of the loads.

FIG. 11 corresponds to FIG. 7, and shows a cross-section through a typical rib 112 of torque box 100. The outer structure of this area of torque box 100 is essentially the same as that shown in FIG. 10; i.e., there are the three groups of fibers (Groups A, B, C) which make up the lower flange, torque tube, and cap subassemblies which are bonded together.

In addition to these, there is a fourth group of plies—Group D—which make up the thickened portion of the box which forms the internal strengthening rib 112. Group D may be made up of some twenty or so additional plies bonded to the inner surface of the torque tube and being wound circumferentially around the hollow core thereof; however, the plies of Group D are preferably not oriented so that their graphite fibers are aligned in a 45° direction relative to the axis of the torque box, as was the case with the Group B plies, but are instead oriented so that their fibers are aligned perpendicularly to the longitudinal axis of the box, essentially in the form of a "hoop" or "ring", which provides a relatively stiffer rib. As will be described below, these ribs may be formed by wrapping graphite-fiber tape in a ring-shaped groove or indentation formed in the exterior of an internal mandrel, on which sheets of graphite fiber fabric are subsequently laid to form the plies of the torque tube subassembly.

FIG. 12 corresponds to FIG. 9, and shows a typical cross-section through the upper and lower bifurcation installation areas. Once again, this area of torque box 100 has the same general cross-sectional configuration as the others, in that it is made up of the three groups (Groups A, B, and C) of plies making up the lower flange, torque tube, and cap portions previously described. As was also previously described, outwardly extending bulges are formed in the forward and after-walls 118 and 120. Also, in order to impart additional strength to this loading-bearing portion of the torque box, the torque tube subassembly in this area includes several (e.g., four) additional plies (plies 21-24); consequently, the wall thickness is increased in the upper and lower bifurcation installation areas, and may be, for example, on the order of 0.1445 inches thick.

Once again, it should be remembered that the above-described torque box assembly is but one example of the application of the present invention to construct a structure for bearing a combination of loads, using efficient combinations of pure composite structures which are specifically configured to bear individual components of such combinations of loads. Accordingly, it should be understood that structures in accordance with the present invention are not limited to the exact geometry of those exemplary embodiments which are described herein.

Figure 13A:
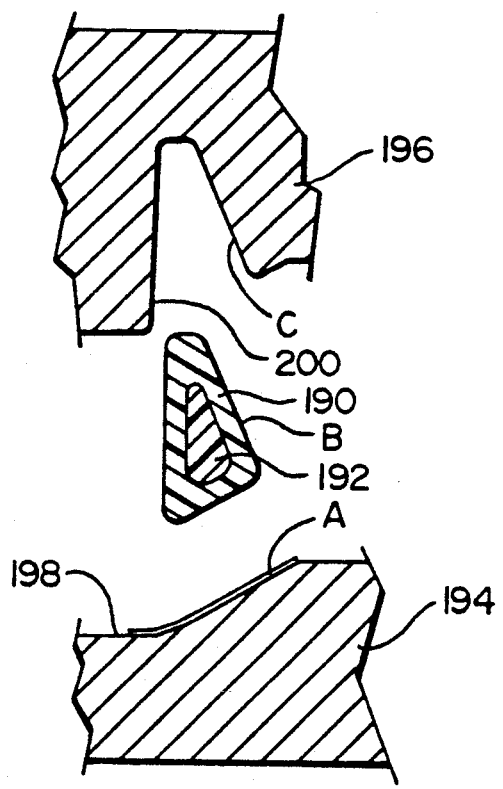
FIGS. 13A-C are a series of sectional schematic views illustrating fabrication of the composite material torque box of the present invention, using a removable inner mandrel and external mold tools.

Having described the structure of an exemplary torque box 100 which incorporates the present invention, a method for its fabrication will now be illustrated with respect to the schematic views shown in FIG. 13, bearing in mind that this particular method is only one example of several possible techniques for building this structure. FIG. 13 shows a series of cross-sections, taken through the torque box subassemblies and the associated internal mandrel and external molding tools, as these go through the assembly process.

In particular, FIG. 13 shows a thin, hollow, inner silicone mandrel 190, this being internally rigidized by autoclave degradable expanded styrene beads 192 (e.g., Styrofoam TM); alternatively, the mandrel can be internally rigidized by other means, such as a removable steel support, a pressurized bladder, or a wash-out removable material such as plaster. The rigidized mandrel 190 serves as a lay-up tool for the graphite fiber fabric of the Group 8 plies which make up the torque tube subassembly. Furthermore, circumferential external indentations or grooves (not shown) are provided at selected locations along mandrel 190, and graphite fiber tape is wrapped in these to form the hoop-like inner strengthening ribs 112 which have been previously described.

In addition to the inner mandrel, first and second mold tools 194, 196 are provided, first mold tool 194 having a semi-planar mold face 198 which conforms to the shape of the semi-planar lower flange subassembly of the torque box, and second mold tool 196 having a recessed mold face 200 which defines a generally triangular cross-section corresponding to the exterior shape of the cap subassembly. As is shown in FIG. 13, the Group A plies of the flange subassembly are laid up on the mold face 198 of tool 194, and the Group C plies making up the cap subassembly are laid up in the recessed mold face 200 of tool 196.

Figure 13B:
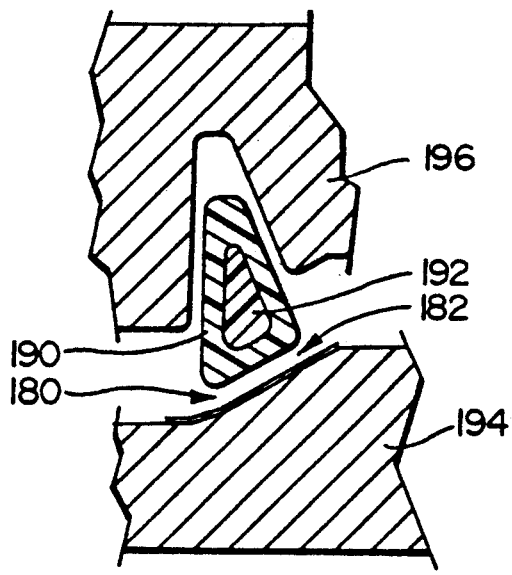

Then, as is shown in FIG. 13B, the resin impregnated (but uncured) subassemblies and the associated mold tools and mandrel are aligned and positioned adjacent one another, and the two filler strips 180, 182 are positioned in the appropriate cavities. Incidentally, extruded chopped fiber filler has been found to be an eminently suitable material for forming these filler strips.

Figure 13C:
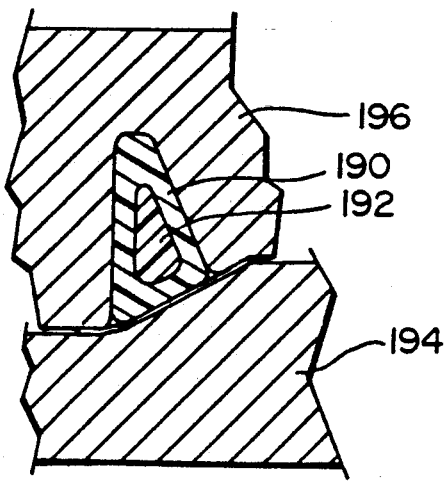

After positioning, the two mold tools 194, 196 are closed about the mandrel 190 as shown in FIG. 13C, and the assembly is cured at an elevated temperature and Pressure. During curing, the flange, cap, and torque tube subassemblies become bonded together so as to form the unitary torque box structure described above. To enhance this process, line pressure may be supplied to internally pressurize the silicone mandrel 190, so as to consolidate the laminate plies against the inner mold surfaces of the outer tools.

During the curing process, the pressurized Styrofoam 192 shrinks and degrades due to the elevated temperature, which permits it to be easily removed after the curing process is complete. After this, the hollow silicone mandrel 190 can be collapsed by applying a vacuum to its interior, so that this also can be removed from the hollow interior of the torque box structure. The remaining finishing operations can then be performed on the unitary composite material torque box, including tooling the outside surface of the torque box where required.

It is to be understood that various changes, modifications, and omissions in form and detail may be made to the present invention without departing from the basic teachings thereof. For example, the present invention may be embodied in structural geometries and fabrication techniques which are considerably different from the illustrative examples described herein. Accordingly, the present invention is not to be limited except as by the appended claims.

What is claimed is:

1. A torque box assembly for mounting in an aircraft engine assembly of the type having an engine mounted to a support structure, and a thrust reverser assembly having at least one actuator member for opening a reverser cowl and cascade members for redirecting a flow of air through said reverser cowl, said torque box assembly comprising:

a generally planar composite material flange subassembly having an after portion which is configured to be mounted to said cascade members of said reverser assembly and a forward portion which is configured to be mounted to said engine, so that said flange subassembly transmits tension loads from said cascade members to said engine; and a composite material torque tube subassembly extending generally along a lengthwise axis and having a central portion which is configured to be mounted to an end of said actuator member and end portions which are configured to be mounted to said support structure, so that said tube subassembly transmits torsion loads from said end of said actuator member to said support structure;

said composite material tube subassembly being attached to a side of said composite material flange subassembly so that said torque box assembly is formed as a substantially unitary composite material structure.

2. The torque box of claim 1, further comprising a composite material cap subassembly mounted to said flange subassembly and extending over said torque tube subassembly, said cap subassembly being attached to said tube subassembly and said flange subassembly so that said torque box is formed as a substantially unitary composite material structure.

3. The torque box assembly of claim 2, wherein said cap subassembly comprises:

a generally planar rear flange portion attached to said after portion of said flange subassembly on said side of said flange subassembly;

a central portion extending over and attached to said torque tube subassembly; and a generally planar forward flange portion attached to said forward portion of said flange subassembly on said side of said flange subassembly.

4. The torque box assembly of claim 2, further comprising at least one composite material strengthening rib extending around said axis of said tube subassembly, said strengthening rib being attached to an interior surface of said torque tube subassembly.

5. The torque box assembly of claim 1, wherein said axis along which said torque tube subassembly extends is curved in a semi-circular direction so as to conform generally to a curved exterior surface of said engine.

6. The torque box assembly of claim 1, wherein said composite material subassemblies are constructed of a composite material which comprises a laminate of plies of linearly-extending fibers impregnated with cured resin.

7. The torque box assembly of claim 6, wherein said composite material is a graphite-reinforced epoxy material.

8. The torque box assembly of claim 6, wherein said subassemblies are attached to one another by co-curing of said resin with which said composite material of said subassemblies is impregnated.

9. The torque box assembly of claim 6, further comprising first and second strips of filler material positioned adjacent first and second sides of said torque tube subassembly where said torque tube subassembly is mounted to said side of said flange subassembly, said strips of filler material being overlain by said cap subassembly and being sized to support said plies of said composite material of said cap subassembly so as to prevent said fibers therein from extending through excessively sharp bends where said torque tube subassembly meets said flange subassembly.

10. The torque box assembly of claim 9, wherein said strips of filler material comprise extruded strips of chopped composite material.

11. The torque box assembly of claim 6, wherein said plies of said composite material of said flange subassembly are aligned so that said fibers extend in a generally linear direction from said after portion of said flange subassembly to said forward portion of said flange subassembly, so that said fibers are aligned with the load paths of said tension loads which are transmitted by said flange subassembly from said cascade members to said engine.

12. The torque box assembly of claim 11, wherein said plies of said composite material of said tube subassembly are aligned so that said fibers extend at substantially 45° angles to said axis of said tube subassembly, so that said fibers are aligned with the load paths of tension and compression components of torsion loads which are transmitted by said torque tube subassembly from said actuator members to said support structure.

13. The torque box assembly of claim 12, further comprising a plurality of internal composite material strengthening ribs extending around said axis of said torque tube subassembly, said strengthening ribs being attached to an interior surface of said tube subassembly, said plies of said composite material of said strengthening ribs being aligned so that said fibers extend at a substantially perpendicular angle to said axis of said tube subassembly, so as to provide said strengthening ribs with relatively greater stiffness than areas of said tube subassembly adjacent said strengthening ribs.

14. The torque box assembly of claim 13, further comprising at least one receiving area formed in said central portion of said tube subassembly for receiving said end of said actuator member.

15. The torque box assembly of claim 14, wherein said area for receiving said end of a said actuator member is flanked by first and second said internal strengthening ribs.

16. The torque box assembly of claim 13, further comprising socket areas formed in said interior of said torque tube subassembly at said ends of said torque tube subassembly, said socket areas being configured for receiving attachment fittings on said support structure.

17. The torque box assembly of claim 16, wherein said torque tube subassembly is generally triangular in cross-section, so that said torque box assembly has generally planar forward and after walls formed by said tube and cap subassemblies, and a generally planar inner wall formed by said tube and flange subassemblies.

18. The torque box assembly of claim 17, wherein said forward wall of said torque box assembly is configured to be mounted to a firewall of said engine assembly.

19. The torque box assembly of claim 18 wherein said after wall of said torque box assembly is configured to be mounted to a second firewall of said engine assembly.

20. The torque box assembly of claim 18, wherein said forward portion of said flange subassembly is configured to be mounted to a V-blade ring for engaging a V-groove formed on said engine.

21. The torque box assembly of claim 20, wherein said inner wall of said torque box assembly is configured to be mounted to a bullnose fairing for providing a smooth flow of air to said cascade members.

22. An aircraft engine assembly having an engine mounted to a support structure, a thrust reverser assembly having at least one actuator member for opening a reverser cowl and cascade members for redirecting a flow of air through said reverser cowl, and a torque box assembly for transmitting forces from said actuator member and said cascade members of said thrust reverser assembly to said engine and said support structure during operation of said reverser assembly, said torque box assembly comprising:

a generally planar composite material flange subassembly having an after portion which is mounted to said cascade members of said reverser assembly and a forward portion which is mounted to said engine, so that said flange subassembly transmits tension loads from said cascade members to said engine; and a composite material torque tube subassembly extending generally along a lengthwise axis and having a central portion which is mounted to an end of said actuator member and end portions which are mounted to said support structure, so that said tube subassembly transmits torsion loads from said end of said actuator member to said support structure;

said composite material tube subassembly being attached to a side of said composite material flange subassembly so that said torque box assembly is formed as a substantially unitary composite material structure.

23. The engine assembly of claim 22, wherein said torque box further comprises a composite material cap subassembly mounted to said flange subassembly and extending over said torque tube subassembly, said cap subassembly being attached to said tube subassembly and said flange subassembly so that said torque box is formed as a substantially unitary composite material structure.

24. The engine assembly of claim 23, wherein said cap subassembly further comprises:

a generally planar rear flange portion attached to said after portion of said flange subassembly on said side of said flange subassembly;

a central portion extending over and attached to said torque tube subassembly; and a generally planar forward flange portion attached to said forward portion of said flange subassembly on said selected side of said flange subassembly.

25. The engine assembly of claim 23, wherein said torque box further comprises at least one composite material strengthening rib extending around said axis of said tube subassembly, said strengthening rib being attached to an interior surface of said torque tube subassembly.

26. The engine assembly of claim 22, wherein said composite material subassemblies are constructed of a composite material which comprises a laminate of plies of linearly-extending fibers impregnated with cured resin.

27. The engine assembly of claim 26, wherein said composite material is a graphite-reinforced epoxy material.

* * * * *